US008855192B2

(12) United States Patent  (10) Patent No.: US 8,855,192 B2
Sagi  (45) Date of Patent: Oct. 7, 2014

(54) DEVICE, METHOD AND SYSTEM FOR TRANSMITTING VIDEO DATA BETWEEN A VIDEO SOURCE AND A VIDEO SINK

(75) Inventor: Ariel Sagi, Haifa (IL)

(73) Assignee: Amimon, Ltd., Herzlia (IL)

( * ) Notice: Subject to any disclaimer, the term of this patent is extended or adjusted under 35 U.S.C. 154(b) by 778 days.

(21) Appl. No.: 12/656,112

(22) Filed: Jan. 19, 2010

(65) Prior Publication Data

US 2010/0123826 A1  May 20, 2010

Related U.S. Application Data

(63) Continuation-in-part of application No. 12/310,730, filed on Dec. 1, 2009, now Pat. No. 8,208,608.

(30) Foreign Application Priority Data

Sep. 5, 2007  (WO) .................. PCT/IL2007/001095

(51) Int. Cl.
| | |
|---|---|
| H04N 7/12 | (2006.01) |
| H04N 11/02 | (2006.01) |
| H04N 11/04 | (2006.01) |
| H04L 5/12 | (2006.01) |
| H04L 23/02 | (2006.01) |
| H03D 3/24 | (2006.01) |
| H04N 7/173 | (2011.01) |
| G06F 15/16 | (2006.01) |
| H04N 21/4363 | (2011.01) |
| H04L 29/06 | (2006.01) |
| H04L 12/28 | (2006.01) |

(52) U.S. Cl.
CPC ........ *H04L 65/602* (2013.01); *H04N 21/43637* (2013.01); *H04L 65/4069* (2013.01); *H04L 12/2838* (2013.01); *H04L 2012/2849* (2013.01)
USPC ...... 375/240.01; 375/262; 375/376; 725/110; 709/233

(58) Field of Classification Search
USPC ....................... 375/240.01; 370/468; 345/214
See application file for complete search history.

(56) References Cited

U.S. PATENT DOCUMENTS 4,373,204 A * 2/1983 Brooks ......................... 375/376
5,939,947 A  8/1999 Nakao et al.
(Continued)

FOREIGN PATENT DOCUMENTS

WO  WO 2006/101801  9/2006
WO  WO 2006/118964  11/2006

OTHER PUBLICATIONS

International Search Report PCT/IL07/01095 dated Sep. 15, 2008.

*Primary Examiner* — Hee-Yong Kim
(74) *Attorney, Agent, or Firm* — Eitan, Mehulal & Sadot

(57) ABSTRACT

Disclosed is a method, circuit and system for transmission of video data between a video source and a video sink. A video source transceiver may include: (1) a video source interface for receiving video data, optionally including one or more video synchronization signals functionally associated video source device; (2) a video source clock sampler for sampling a video clock parameter of received video data; (3) a video data buffer for buffering received video data prior to transmission; and (4) a video transmission circuit including packet size timing logic adapted to generate and transmit to a functionally associated video sink transceiver a value correlated to an expected data packet size based on video data stored in the video buffer. A video sink transceiver may include: (1) a video reception circuit adapted to receive a transmitted data packet, including one or more values generated by the packet size timing logic, and to regenerate a video frame; (2) video sync signal generation logic adapted to regenerate one or more video frame synchronization signals based on the one or more values generated by the video transmission circuit, and (3) a video sink interface for forwarding received video data, including one or more video clock and/or synchronization signals to a functionally associated video sink device.

5 Claims, 5 Drawing Sheets

(56) References Cited

U.S. PATENT DOCUMENTS

| | | |
|---|---|---|
| 6,154,466 A | 11/2000 | Iwasaki et al. |
| 6,310,653 B1 | 10/2001 | Malcolm, Jr. et al. |
| 6,404,818 B1 | 6/2002 | Obikane |
| 6,609,167 B1 * | 8/2003 | Bastiani et al. ............ 710/104 |
| 6,769,030 B1 * | 7/2004 | Bournas ..................... 709/233 |
| 6,819,190 B2 | 11/2004 | Pearce et al. |
| 7,024,575 B2 | 4/2006 | Lienhart et al. |
| 7,064,621 B2 | 6/2006 | Nakanishi |
| 7,386,216 B2 | 6/2008 | Watanabe et al. |
| 7,511,762 B2 | 3/2009 | Elnathan et al. |
| 7,558,326 B1 | 7/2009 | Lyle et al. |
| 2002/0063632 A1 * | 5/2002 | Bowman et al. ......... 340/825.19 |
| 2006/0209745 A1 | 9/2006 | MacMullan et al. |
| 2006/0209890 A1 | 9/2006 | MacMullan et al. |
| 2006/0209892 A1 | 9/2006 | MacMullan et al. |
| 2006/0212911 A1 | 9/2006 | MacMullan et al. |
| 2007/0098063 A1 | 5/2007 | Reznic et al. |
| 2007/0121550 A1 | 5/2007 | Wada |
| 2007/0236605 A1 | 10/2007 | Saito et al. |
| 2007/0248320 A1 | 10/2007 | Watanabe et al. |
| 2008/0172708 A1 * | 7/2008 | Perry et al. .................... 725/110 |
| 2008/0198153 A1 * | 8/2008 | Yu et al. ........................ 345/214 |
| 2010/0067598 A1 * | 3/2010 | Sampath et al. .............. 375/262 |

* cited by examiner

DEVICE, METHOD AND SYSTEM FOR TRANSMITTING VIDEO DATA BETWEEN A VIDEO SOURCE AND A VIDEO SINK

CROSS-REFERENCE TO RELATED APPLICATIONS

The present application is a continuation-in-part application of U.S. patent application Ser. No. 12/310,730, (371 filing date of Dec. 1, 2009) now U.S. Pat. No. 8,208,068 which is a US National Phase of PCT Application No. PCT/IL2007/001095, filed on Sep. 5, 2007, which claims priority to U.S. application Ser. No 11/470,582 filed Sep. 6, 2006, the entire disclosures of which are incorporated herein by reference.

FIELD OF THE INVENTION

Some embodiments relate generally to the field of wireless communication and, more particularly, to a device, method and system for transmitting video data between a video source and a video sink.

BACKGROUND

Wireless communication has rapidly evolved over the past decades. Even today, when high performance and high bandwidth wireless communication equipment is made available there is demand for even higher performance at a higher data rates, which may be required by more demanding applications.

Video signals may be generated by various video sources, for example, a computer, a game console, a Video Cassette Recorder (VCR), a Digital-Versatile-Disc (DVD), a Blu-ray (BR) disk player, or any other suitable video source. In many houses, for example, video signals are received through cable or satellite links at a Set-Top Box (STB) located at a fixed point.

In many cases, it may be desired to place a screen or projector at a location in a distance of at least a few meters from the video source. This trend is becoming more common as flat-screen displays, e.g., plasma or Liquid Crystal Display (LCD) televisions are hung on a wall. Connection of such a display or projector to the video source through cables is generally undesired for aesthetic reasons and/or installation convenience. Thus, wireless transmission of the video signals from the video source to the screen is preferred.

WHDI—Wireless Home Digital Interface is a new standard for wireless high-definition video connectivity between a video source (e.g. cable box) and video sink (e.g. display). It provides a high-quality, uncompressed wireless link which can support delivery of equivalent video data rates of up to 3 Gbit/s (including uncompressed 1080p) in a 40 MHz channel within the 5 GHz unlicensed band. Equivalent video data rates of up to 1.5 Gbit/s (including uncompressed 1080i and 720p) can be delivered on a single 20 MHz channel in the 5 GHz unlicensed band, conforming to worldwide 5 GHz spectrum regulations. Range is beyond 100 feet (30 m), through walls, and latency is less than one millisecond.

Operating in the 5 GHz unlicensed band allows for there to be interfering signals from other transmissions in the widely used band. This may affect start-of-packet detection on the receiver side.

Variation among video sources causes a variation in clock and synchronization signals. Therefore, video frame timing must be carefully monitored on the source and sink side of a transmission.

There is thus a need in the field of wireless communication for improved devices, methods and systems for transmitting video data between a video source and a video sink.

SUMMARY OF THE INVENTION

The present invention is a method, circuit and system for transmission of video data between a video source and a video sink. According to some embodiments of the present invention, a video source transceiver may include: (1) a video source interface for receiving video data, optionally including one or more video synchronization signals (e.g. Vsync and Hsync), from a functionally associated video source device (e.g. Set-Top Box, DVD, etc.); (2) a video source clock sampler for sampling a video clock (e.g. a pixel clock) parameter of received video data; (3) a video data buffer for buffering received video data prior to transmission; (4) a video transmission circuit including packet size timing logic adapted to generate and transmit to a functionally associated video sink transceiver a value correlated to an expected data packet size (i.e. modem frame length) based on video data stored in the video buffer.

According to some embodiments of the present invention, the packet size timing logic may monitor the amount of video data stored in the video buffer and determine a buffer level value. According to further embodiments of the present invention, one or more video synchronization signals included with the video data may be used as video frame markers, distinguishing between video frames stored in the buffer.

According to some embodiments of the present invention, the packet size timing logic may be integral with or otherwise functionally associated with a transmission scheduler adapted to receive the buffer level value. According to further embodiments of the present invention, the transmission scheduler may generate one of a plurality of data packet sizes (i.e. modem frame lengths) values for the video transmission circuit based on the received buffer level value. According to some embodiments of the present invention, a data packet size value may be determined for transmitting some or all of the video data stored in the video buffer. According to some embodiments of the present invention when the buffer level value reaches an upper threshold, the transmission scheduler may generate a data packet size value that is smaller than the standard value. According to further embodiments of the present invention, a packet may be sent a predefined amount of time earlier than a standard video transmission to compensate for the high buffer level. The predefined amount of time may be correlated to a transmission symbol size. According to some embodiments of the present invention when the buffer level value reaches a lower threshold, the transmission scheduler may generate a data packet size value that is larger than the standard value. According to further embodiments of the present invention, a packet may be sent a predefined amount of time later than a standard video transmission to compensate for the low buffer level. The predefined amount of time may be correlated to a transmission symbol size.

According to some embodiments of the present invention when the buffer level value reaches an upper threshold, packets may be transmitted at a faster rate. According to further embodiments of the present invention, the buffer level may decrease at a faster rate than a standard video transmission rate. According to some embodiments of the present invention when the buffer level value reaches a lower threshold, packets may be transmitted at a slower rate. According to further embodiments of the present invention, the buffer level may increase at a faster rate than a standard video transmission rate.

According to some embodiments of the present invention, the packet size timing logic may be integral with or otherwise functionally associated with a transmission message generator adapted to receive a data packet size value from the transmission scheduler. The transmission messenger may also receive a value correlated to the rate of sending video data from the buffer to the video transmission circuit. According to further embodiments of the present invention, the transmission messenger may generate a countdown message relating to a non-standard modem frame transmission. According to further embodiments of the present invention, countdown messages may be sent to a functionally associated video sink transceiver.

According to some embodiments of the present invention, the video transmission circuit may be further adapted to generate a timestamp to be transmitted with each data packet (i.e. modem frame). According to further embodiments of the present invention, the timestamp may be a phase value correlated to a sampling of a video clock (e.g. a pixel clock) parameter received from the video source clock sampler.

According to some embodiments of the present invention, a video sink transceiver may include: (1) a video reception circuit adapted to receive a transmitted data packet (i.e. modem frame), including one or more values generated by the packet size timing logic, and to regenerate a video frame; (2) video sync signal generation logic adapted to regenerate one or more video frame synchronization signals based on the one or more values generated by the video transmission circuit, and (3) a video sink interface for forwarding received video data, including one or more video clock and/or synchronization signals (e.g. Vsync and Hsync), to a function associated video sink device (e.g. monitor, projector, television, etc.).

According to some embodiments of the present invention, the video reception circuit may include a data packet tracking logic adapted to receive data packet size values, including countdown messages from a video source transceiver and generate a reference phase value. According to further embodiments of the present invention, data packet detection logic and the data packet tracking logic may be integral with or otherwise functionally associated with a packet size timing phase locked loop adapted to receive the reference phase value, and generate a packet start detection value. According to further embodiments of the present invention, the packet start detection value may alert the video reception circuit to decode received packets into video/audio data frames to be sent to the buffer.

According to some embodiments of the present invention, the video sync signal generation logic may be further adapted to receive a timestamp correlated to a received data packet. According to further embodiments of the present invention, the video sync signal generation logic may generate a phase value correlated to a video clock (e.g. a pixel clock) sampling. According to further embodiments of the present invention, the video sync signal generation logic may be integral with or otherwise functionally associated with a video clock phase locked loop adapted to receive the phase value and generate video clock data correlated to a received video frame. According to further embodiments of the present invention, the video clock data is forwarded to the video sink interface along with the correlated video frame.

It should be understood that video data, as described herein, may also include and/or refer to audio data. Thus, video data based logic, circuits, modules, and signals, may also include and/or refer to audio data based logic, circuits, modules, and signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
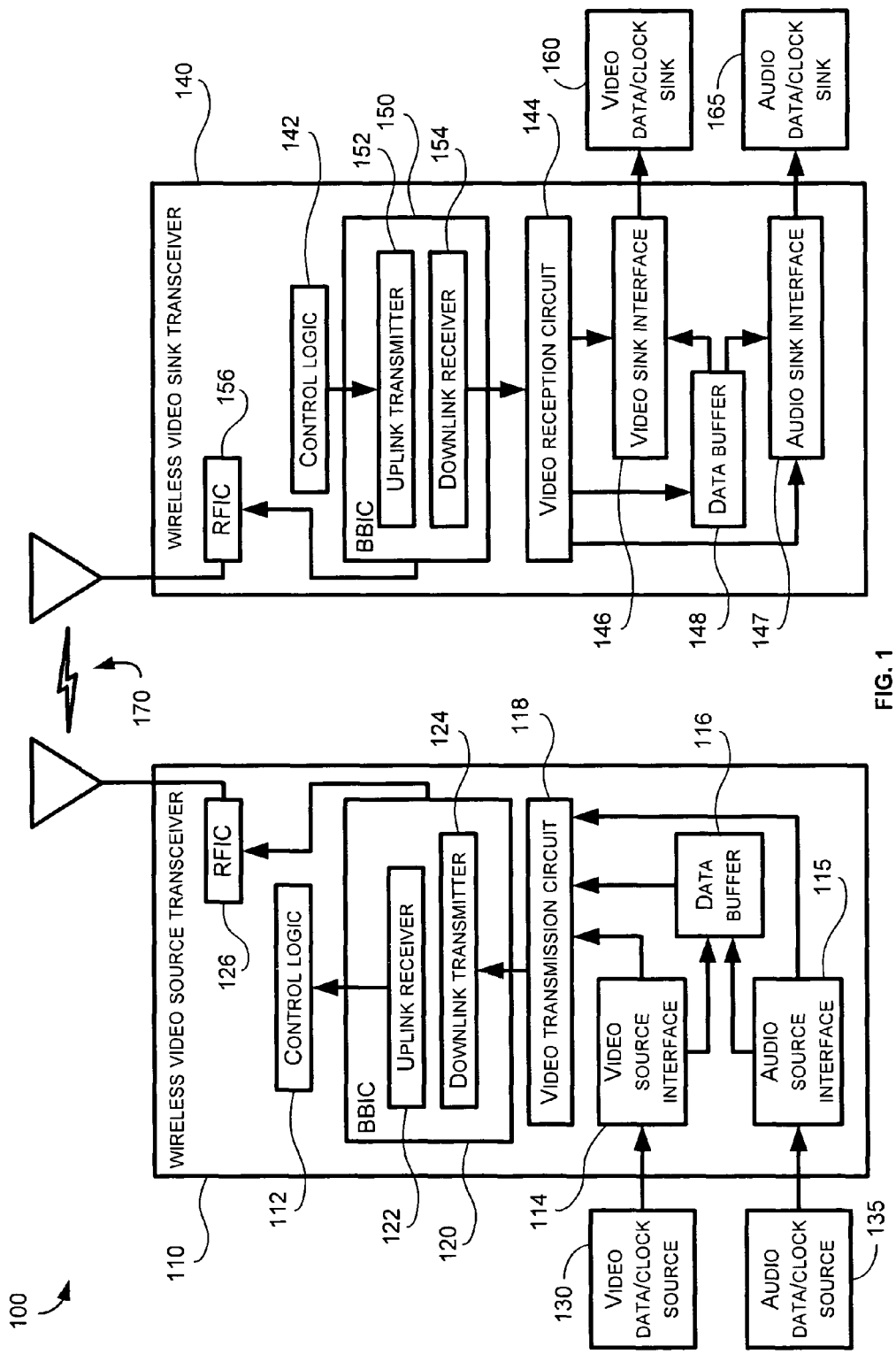
FIG. 1 is a functional block diagram of an exemplary video source transceiver and video sink transceiver arrangement according to some embodiments of the present invention where the video source transceiver includes a video transmission circuit and the video sink transceiver includes a video reception circuit.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality"

may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to wirelessly transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Although some demonstrative embodiments are described herein with relation to wireless communication including video information, some embodiments may be implemented to perform wireless communication of any other suitable information, for example, multimedia information, e.g., audio information, in addition to or instead of the video information. Some embodiments may include, for example, a method, device and/or system performing wireless communication of A/V information, e.g., including audio and/or video information. Accordingly, one or more of the devices, systems and/or methods described herein with relation to video information may be adapted to perform wireless communication of A/V information.

Some demonstrative embodiments may be implemented to communicate wireless-video signals over a wireless-video communication link, as well as Wireless-Local-Area-Network (WLAN) signals over a WLAN link. Such implementation may allow a user, for example, to play a movie, e.g., on a laptop computer, and to wirelessly transmit video signals corresponding to the movie to a video destination, e.g., a screen, while maintaining a WLAN connection, e.g., with the Internet and/or one or more other devices connected to a WLAN network. In one example, video information corresponding to the movie may be received over the WLAN network, e.g., from the Internet.

According to some embodiments of the present invention, a video source transceiver may comprise: a video source interface adapted to receive video data from a functionally associated video source; a video source clock sampler for sampling a video clock parameter of received video data; and a transmission circuit adapted to transmit video data along with information regarding the sampled video clock parameter. According to further embodiments of the present invention, the video source transceiver may further comprise an audio clock sampler for sampling an audio clock parameter of audio data received along with the video data. According to further embodiments of the present invention, the transmission circuit may be adapted to transmit the audio data along with information regarding the sampled audio clock parameter. According to some embodiments of the present invention, either the sampled video clock parameter or the sampled audio clock parameter may be a phase of the clock.

According to some embodiments of the present invention, the video source transceiver may further comprise a video data buffer adapted to store video data received from a video source. According to further embodiments of the present invention, the video source transceiver may further comprise packet size timing logic adapted to generate and transmit to a functionally associated video sink transceiver a value correlated to an expected data packet size based on video data stored in the video buffer. According to further embodiments of the present invention, the video source transceiver may be further adapted to generate and transmit to a functionally associated video sink transceiver a countdown message correlated to an expected time of arrival of a data packet.

According to some embodiments of the present invention, a video sink transceiver may comprise: a video reception circuit adapted to receive a video data bearing data packet along with information regarding a sampled video clock parameter; a video sync signal generation logic adapted to receive the information regarding a sampled video clock parameter and generate video clock data; and a video sink interface adapted to transmit the video data along with the generated video clock data to a functionally associated video sink. According to further embodiments of the present invention, the video sink transceiver may further comprise an audio sync signal generation logic adapted to receive information regarding a sampled audio clock parameter correlated to audio data received along with the video data and generate audio clock data. According to further embodiments of the present invention, the video sink transceiver may further comprise an audio sink interface adapted to transmit the audio data along with the generated audio clock data to a functionally associated audio sink. According to further embodiments of the present invention, either the sampled video clock parameter or the sampled audio clock parameter may be a phase of the clock.

According to some embodiments of the present invention, the video sync signal generation logic may further comprise a video clock phase locked loop adapted to receive the information regarding a sampled video clock phase and generate video clock data. According to further embodiments of the present invention, the audio sync signal generation logic may further comprise an audio clock phase locked loop adapted to receive the information regarding a sampled audio clock phase and generate audio clock data.

According to some embodiments of the present invention, the video sink transceiver may further comprise a data packet tracking logic adapted to receive a value correlated to an expected data packet size and generate a reference phase value. According to further embodiments of the present invention, the data packet tracking logic may further comprise a packet size timing phase locked loop adapted to receive the reference phase value and estimate a packet size. According to further embodiments of the present invention, the estimated packet size may be used to predict packet start timing.

According to some embodiments of the present invention, a video source transceiver may comprise: a video source interface adapted to receive video data from a functionally associated video source; a video data buffer adapted to store video data received from a video source; and a packet size timing logic adapted to generate and transmit to a functionally associated video sink transceiver a value correlated to an expected data packet size based on video data stored in the video buffer. According to further embodiments of the present invention, the video source transceiver may be further adapted to generate and transmit to a functionally associated video sink transceiver a countdown message correlated to an expected time of arrival of a data packet.

According to some embodiments of the present invention, the video source transceiver may further comprise a video source clock sampler for sampling a video clock parameter of received video data. According to further embodiments of the present invention, the video source transceiver may further comprise a transmission circuit adapted to transmit video data along with information regarding the sampled video clock parameter. According to further embodiments of the present invention, the video source transceiver may further comprise an audio clock sampler for sampling an audio clock parameter of audio data received along with the video data. According to further embodiments of the present invention, the transmission circuit may be adapted to transmit the audio data along with information regarding the sampled audio clock parameter. According to some embodiments of the present invention, either the sampled video clock parameter or the sampled audio clock parameter may be a phase of the clock.

According to some embodiments of the present invention, a video sink transceiver may comprise: a data packet tracking logic adapted to receive a value correlated to an expected data packet size and generate a reference phase value. According to further embodiments of the present invention, the data packet tracking logic may further comprise a packet size timing phase locked loop adapted to receive the reference phase value and estimate a packet size. According to further embodiments of the present invention, the estimated packet size may be used to predict packet start timing.

According to some embodiments of the present invention, the video sink transceiver may further comprise: a video reception circuit adapted to receive a video data bearing data packet along with information regarding a sampled video clock parameter; a video sync signal generation logic adapted to receive the information regarding a sampled video clock parameter and generate video clock data; and a video sink interface adapted to transmit the video data along with the generated video clock data to a functionally associated video sink. According to further embodiments of the present invention, the video sink transceiver may further comprise an audio sync signal generation logic adapted to receive information regarding a sampled audio clock parameter correlated to audio data receiver along with the video data and generate audio clock data. According to further embodiments of the present invention, the video sink transceiver may further comprise an audio sink interface adapted to transmit the audio data along with the generated audio clock data to a functionally associated audio sink. According to further embodiments of the present invention, either the sampled video clock parameter or the sampled audio clock parameter may be a phase of the clock.

According to some embodiments of the present invention, the video sync signal generation logic may further comprise a video clock phase locked loop adapted to receive the information regarding a sampled video clock phase and generate video clock data. According to further embodiments of the present invention, the audio sync signal generation logic may further comprise an audio clock phase locked loop adapted to receive the information regarding a sampled audio clock phase and generate audio clock data.

Now turning to FIG. 1, there is shown a functional block diagram of an exemplary video source transceiver and video sink transceiver arrangement (100) according to some embodiments of the present invention where the video source transceiver includes a video transmission circuit and the video sink transceiver includes a video reception circuit.

According to some embodiments of the present invention, a wireless video source transceiver (110) may include a base-band integrated chip (BBIC) and a radio-frequency chip (RFIC) (120 & 126) to transmit and receive data signals along with functionally associated antennas. According to further embodiments of the present invention, the BBIC (120) may include a downlink transmitter (124) for transmitting downlink data signals and an uplink receiver (122) for receiving uplink data signals.

According to some embodiments of the present invention, the wireless video source transceiver (110) may process control signals received via the uplink receiver (122) and send the data to a functionally associated control circuit and/or processor (112).

According to some embodiments of the present invention, the wireless video source transceiver (110) may include a video source interface (114) to take incoming video data and clock signals from a functionally associated video data and clock source (130). According to further embodiments of the present invention, video data may be sent to a functionally associated or integral data buffer (116) and video clock data may be sent to a functionally associated or integral video transmission circuit (118). According to further embodiments of the present invention, the data buffer (116) may send the video data to the video transmission circuit (118). According to further embodiments of the present invention, the video transmission circuit (118) may process the video data and the video clock data for downlink transmission, via the downlink transmitter (124), to a functionally associated wireless video sink transceiver (140).

According to some embodiments of the present invention, the wireless video source transceiver (110) may include an audio source interface (115) to take incoming audio data and clock signals from a functionally associated audio data and clock source (135). According to further embodiments of the present invention, audio data may be sent to a functionally associated or integral data buffer (116) and audio clock data may be sent to a functionally associated or integral video transmission circuit (118). According to further embodiments of the present invention, the data buffer (116) may send the audio data to the video transmission circuit (118). According to further embodiments of the present invention, the video transmission circuit (118) may process the audio data and the audio clock data for downlink transmission, via the downlink transmitter (124), to a functionally associated wireless video sink transceiver (140).

According to some embodiments of the present invention, a wireless video sink transceiver (140) may include a BBIC and a RFIC (150 & 156) to transmit and receive data signals along functionally associated antennas. According to further embodiments of the present invention, the BBIC (150) may include a downlink receiver (154) for receiving downlink data signals and an uplink transmitter (152) for transmitting uplink data signals.

According to some embodiments of the present invention, the wireless video sink transceiver (140) may process control data received from a functionally associated control circuit and/or processor (142) and send the control data to the uplink transmitter (152).

According to some embodiments of the present invention, the wireless video sink transceiver (140) may include a video reception circuit (144) to take video data signals received, via the downlink receiver (154), from a functionally associated wireless video source transceiver (110) and process the data for a functionally associated or integral video sink interface (146), audio sink interface (147), and data buffer (148). According to further embodiments of the present invention, the data buffer (148) may send received video data to the video sink interface (146). According to further embodiments of the present invention, the data buffer (148) may send received audio data to the audio sink interface (147). According to further embodiments of the present invention, the video sink interface (146) may receive video data and video clock data and forward the data to a functionally associated video data and clock sink (160). According to further embodiments of the present invention, the audio sink interface (147) may receive audio data and audio clock data and forward the data to a functionally associated audio data and clock sink (165).

Figure 2A:
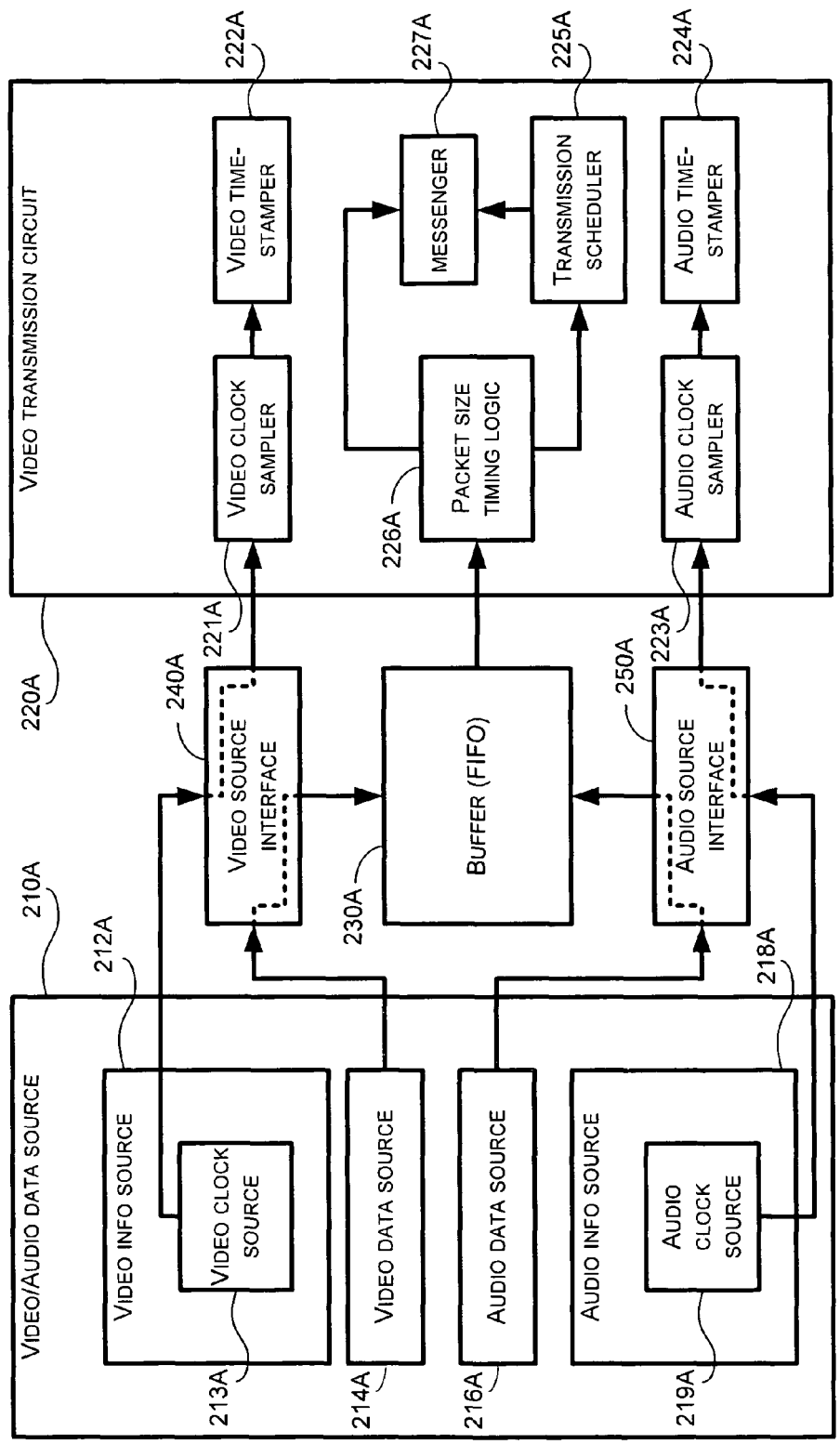
FIG. 2A is a functional block diagram of an exemplary data transmitter according to some embodiments of the present invention where the video transmission circuit includes packet size timing logic.

Now turning to FIG. 2A, there is shown a functional block diagram of an exemplary data transmitter according to some embodiments of the present invention where the video transmission circuit includes packet size timing logic.

According to some embodiments of the present invention, the data transmitter may include a video/audio data source (210A) comprising: a video info source (212A); a video data source (214A); an audio data source (216A); and an audio info source (218A). The video info source (212A) may contain a video clock source (213A) and the audio info source may contain an audio clock source (219).

According to some embodiments of the present invention, the data transmitter may include a video source interface (240A) to take incoming video data from the video data source (214A) and incoming clock signals from the video clock source (213A). According to further embodiments of the present invention, video data may be sent to a functionally associated or integral data buffer (230A) and video clock data may be sent to a functionally associated or integral video transmission circuit (220A). According to further embodiments of the present invention, the data buffer (230A) may send the video data to the video transmission circuit (220A). According to further embodiments of the present invention, the video transmission circuit (220A) may process the video data and the video clock data for downlink transmission to a functionally associated data receiver.

According to some embodiments of the present invention, the data transmitter may include an audio source interface (250A) to take incoming audio data from the audio data source (216A) and incoming clock signals from the audio clock source (219A). According to further embodiments of the present invention, audio data may be sent to a functionally associated or integral data buffer (230A) and audio clock data may be sent to a functionally associated or integral video transmission circuit (220A). According to further embodiments of the present invention, the data buffer (230A) may send the audio data to the video transmission circuit (220A). According to further embodiments of the present invention, the video transmission circuit (220A) may process the audio data and the audio clock data for downlink transmission to a functionally associated data receiver.

According to some embodiments of the present invention, the data transmit may include a video transmission circuit comprising: a video clock sampler (221A); a video time stamper (222A); an audio clock sampler (223A); an audio time stamper (224A); a packet size timing logic (226A); a transmission scheduler (225A); and a messenger (227A).

According to some embodiments of the present invention, the video clock sampler (221A) may sample a video clock (e.g. a pixel clock) signal received from the video source interface (240A). According to further embodiments of the present invention, the video time stamper (222A) may receive the video clock sampling and generate a timestamp. The timestamp may be attached to each data packet before downlink transmission. According to further embodiments of the present invention, the timestamp may be a phase value correlated to the video clock sampling.

According to some embodiments of the present invention, the audio clock sampler (223A) may sample an audio clock signal received from the audio source interface (250A). According to further embodiments of the present invention, the audio time stamper (224A) may receive the audio clock sampling and generate a timestamp. The timestamp may be attached to each data packet before downlink transmission. According to further embodiments of the present invention, the timestamp may be a phase value correlated to the audio clock sampling.

According to some embodiments of the present invention, the packet size timing logic (226A) may generate a value correlated to an expected data packet size based on video data stored in the video buffer. The packet size timing logic (226A) may monitor the amount of video data stored in the video buffer and determine a buffer level value. According to further embodiments of the present invention, one or more video synchronization signals included with the video data may be used as video frame markers, distinguishing between video frames stored in the buffer.

According to some embodiments of the present invention, the packet size timing logic (226A) may be integral with or otherwise functionally associated with a transmission scheduler (225A) adapted to receive the buffer level value and generate one of a plurality of data packet size values for the video transmission circuit based on the received buffer level value. According to further embodiments of the present invention, a transmission messenger (227A) may receive a data packet size value from the transmission scheduler. The transmission messenger (227A) may also receive a value correlated to the rate of sending video data from the buffer (230A) to the video transmission circuit (220A). According to further embodiments of the present invention, the transmission messenger (227A) may generate a countdown message relating to a non-standard data packet transmission. According to further embodiments of the present invention, countdown messages may be sent to a functionally associated data receiver.

Figure 2B:
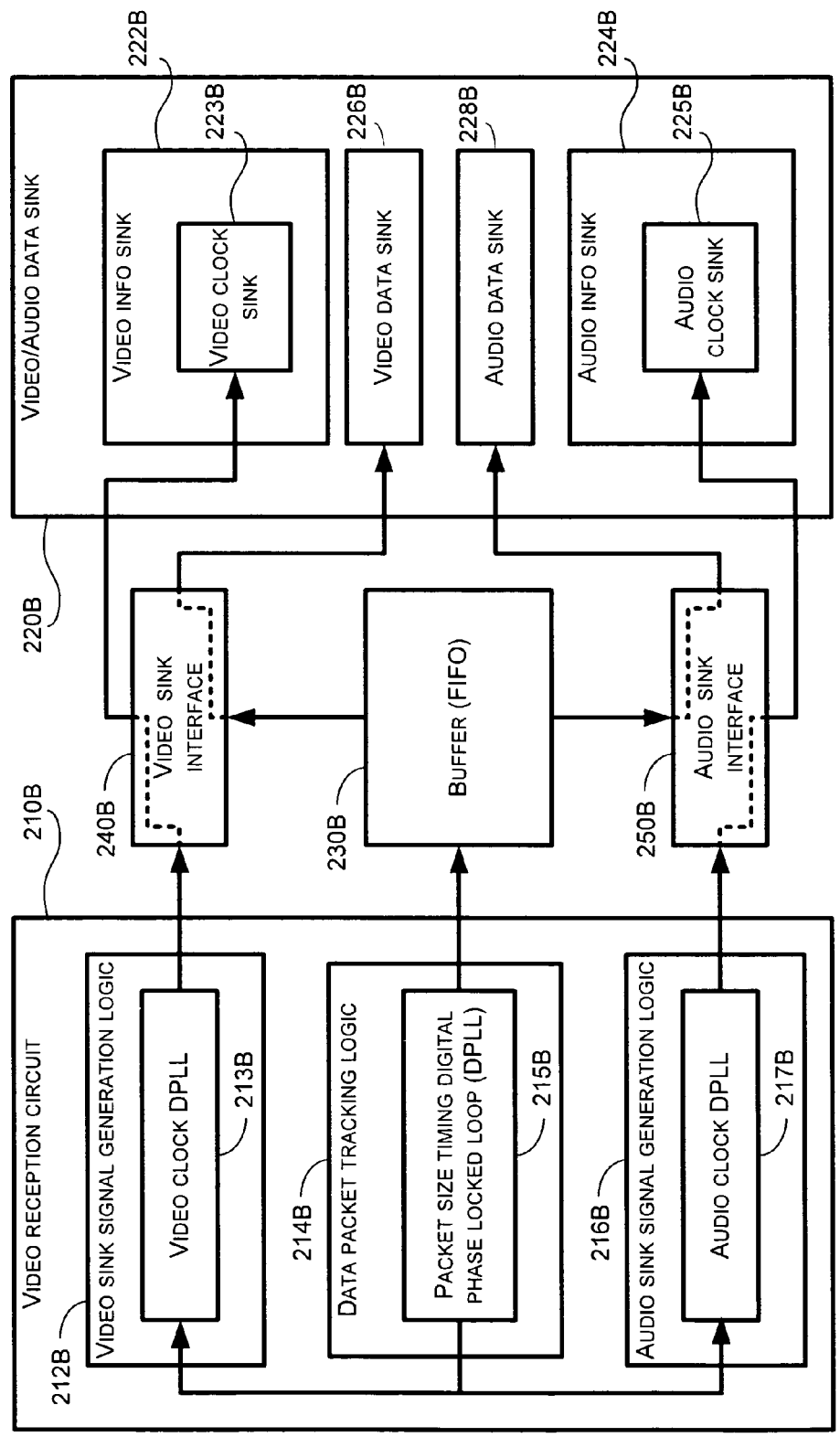
FIG. 2B is a functional block diagram of an exemplary data receiver according to some embodiments of the present invention where the video reception circuit includes data packet tracking logic.

Now turning to FIG. 2B, there is shown a functional block diagram of an exemplary data receiver according to some embodiments of the present invention where the video reception circuit includes data packet tracking logic.

According to some embodiments of the present invention, the data receiver may include a video reception circuit (210B), for receiving a data packet transmitted from a functionally associated transmitter and sending the video/audio data frames to a functionally associated or integral buffer (230B), comprising: video sink signal generation logic (212B); data packet tracking logic (214B); and audio sink signal generation logic (216B). The video sink signal generation logic (212B) may include a video clock digital phase locked loop (213B). The data packet tracking logic (214B) may include a packet size timing digital phase locked loop (215B). The audio sink signal generation logic (216B) may include an audio clock digital phase locked loop (217B).

According to some embodiments of the present invention, the video reception circuit (210B) may include a data packet tracking logic (214B) adapted to receive data packet size values, including countdown messages from a functionally associated transmitter and generate a reference phase value. The packet size timing phase locked loop (215B) may use the reference phase value to generate a packet start detection value. According to further embodiments of the present invention, the packet start detection value may alert the video reception circuit (210B) to decode received packets into video/audio data frames to be sent to the buffer (230B). The packet start detection value may also be used as inputs to the video clock digital phase locked loop (213B) and the audio clock digital phase locked loop (217B).

According to some embodiments of the present invention, the video sync signal generation logic (212B) may generate a phase value correlated to a timestamp received with a data packet from a functionally associated transmitter. The phase value, in addition to the packet start detection value, may be used by the video clock digital phase locked loop (213B) to generate video clock data correlated to a received video frame. According to further embodiments of the present invention, the video clock data is forwarded to a functionally associated or integral video sink interface (240B).

According to some embodiments of the present invention, the audio sync signal generation logic (216B) may generate a phase value correlated to a timestamp received with a data packet from a functionally associated transmitter. The phase value, in addition to the packet start detection value, may be used by the audio clock digital phase locked loop (217B) to generate audio clock data correlated to a received audio frame. According to further embodiments of the present invention, the audio clock data is forwarded to a functionally associated or integral audio sink interface (250B).

According to some embodiments of the present invention, the data receiver may include a video sink interface (240B) for forwarding video data received from the buffer (230B) to a functionally associated video data sink (226B). Video clock data received from the video clock digital phase locked loop (213B) may be forwarded to a functionally associated video clock sink (223B).

According to some embodiments of the present invention, the data receiver may include an audio sink interface (250B) for forwarding audio data received from the buffer (230B) to a functionally associated audio data sink (228B). Audio clock data received from the audio clock digital phase locked loop (217B) may be forwarded to a functionally associated audio clock sink (225B).

Figure 3A:
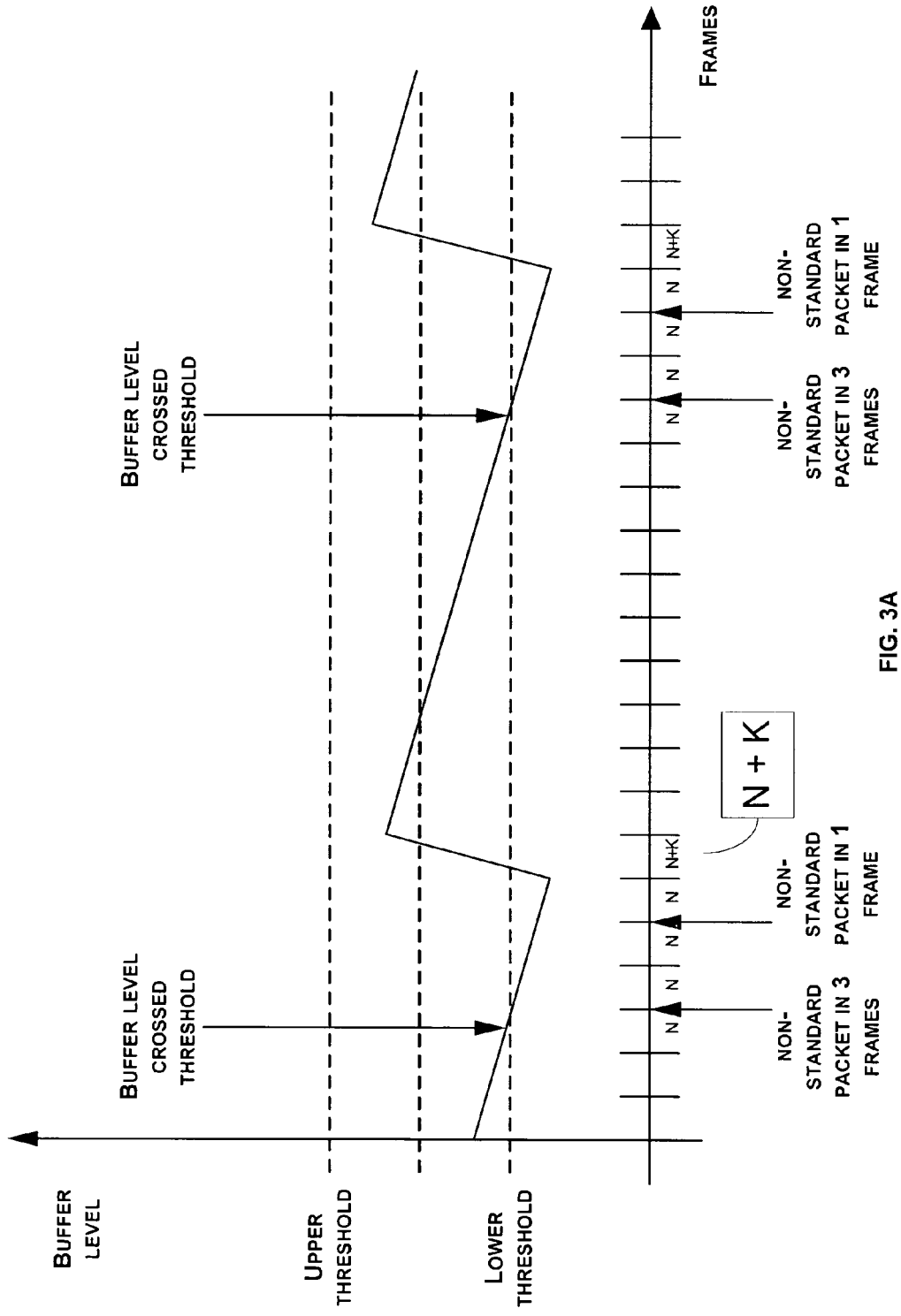
FIG. 3A is a schematic chart showing a buffer level at consecutive frames according to some embodiments of the present invention where the buffer level crosses a lower threshold.

Now turning to FIG. 3A, there is shown a schematic chart showing a buffer level at consecutive frames according to some embodiments of the present invention where the buffer level crosses a lower threshold.

According to some embodiments of the present invention, a data packet size value (N) may be determined for transmitting video data stored in a video buffer. According to some embodiments of the present invention when the buffer level value reaches a lower threshold, the transmission scheduler may generate a data packet size value that is larger than the standard value (N+K). According to further embodiments of the present invention, a packet may be sent a predefined amount of time later than a standard video transmission to compensate for the low buffer level. The predefined amount of time may be an addition to the packet size correlated to a transmission symbol (e.g. OFDM symbol) size. According to some embodiments of the present invention when the buffer level value reaches a lower threshold, packets may be transmitted at a slower rate. According to further embodiments of the present invention, the buffer level may increase at a faster rate than a standard video transmission rate.

Figure 3B:
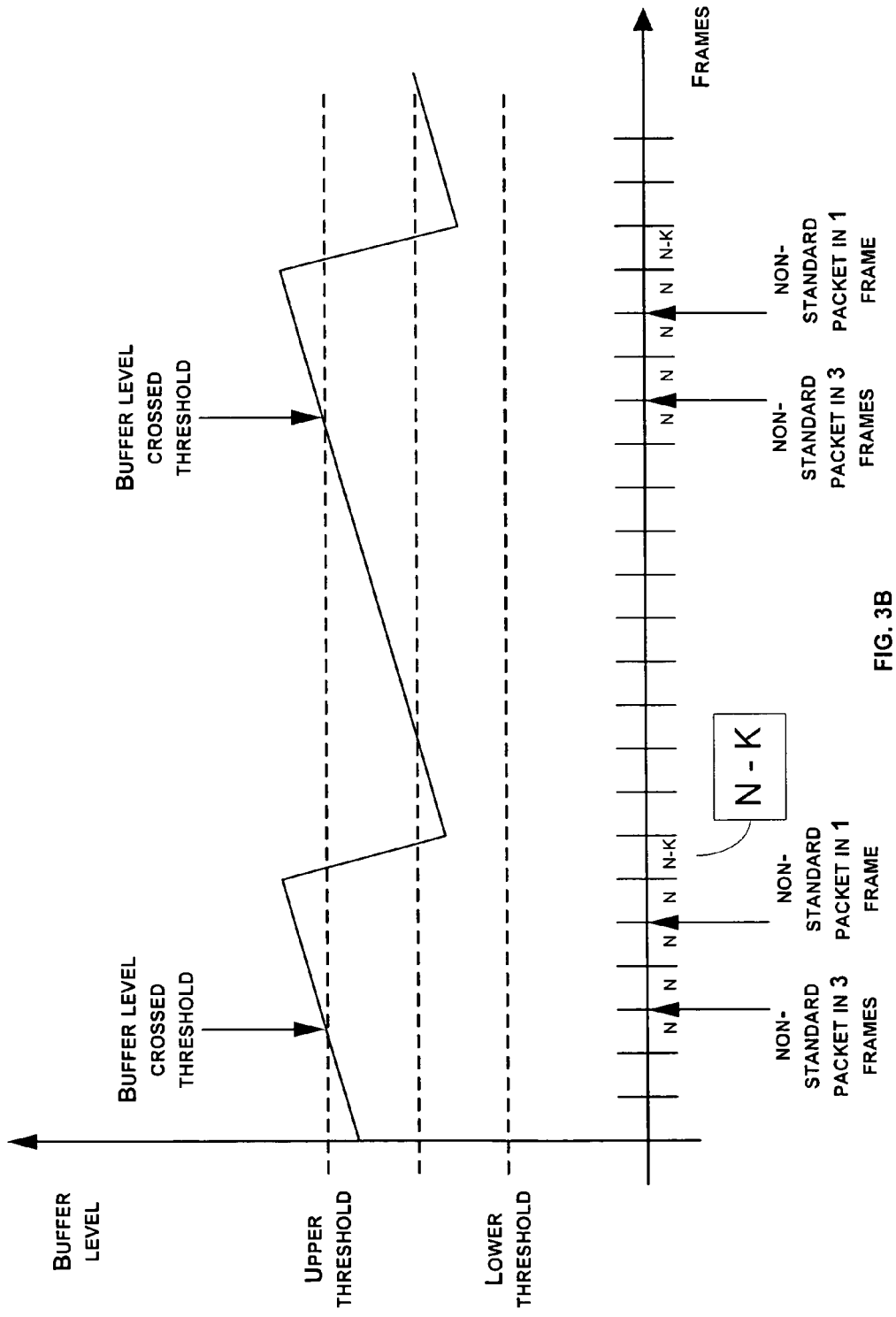
FIG. 3B is a schematic chart showing a buffer level at consecutive frames according to some embodiments of the present invention where the buffer level crosses an upper threshold.

Now turning to FIG. 3B, there is shown a schematic chart showing a buffer level at consecutive frames according to some embodiments of the present invention where the buffer level crosses an upper threshold.

According to some embodiments of the present invention, a data packet size value (N) may be determined for transmitting video data stored in a video buffer. According to some embodiments of the present invention when the buffer level value reaches an upper threshold, the transmission scheduler may generate a data packet size value that is smaller than the standard value (N−K). According to further embodiments of the present invention, a packet may be sent a predefined amount of time earlier than a standard video transmission to compensate for the high buffer level. The predefined amount of time may be a subtraction from the packet size correlated to a transmission symbol (e.g. OFDM symbol size. According to some embodiments of the present invention when the buffer level value reaches an upper threshold, packets may be transmitted at a faster rate. According to further embodiments of the present invention, the buffer level may decrease at a faster rate than a standard video transmission rate.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A video source wireless transceiver comprising:
a video source interface adapted to receive video data from a functionally associated video source;
a video source clock sampler for sampling a current video clock parameter of a received first video data packet, wherein said current video clock parameter is at least partially used to estimate transmission timing of a second video data packet to be transmitted to a video sink wireless transceiver; and
a transmission circuit adapted to transmit to the video sink wireless transceiver information regarding an expected time of arrival for the second video data packet at the video sink wireless transceiver;
wherein the second video data packet is prepared to be sent substantially after the information regarding an expected arrival time is transmitted.

2. The video source transceiver according to claim 1, further comprising an audio clock sampler for sampling an audio clock parameter of audio data received along with the video data, and wherein said transmission circuit is adapted to transmit the audio data along with information regarding the sampled audio clock parameter.

3. The video source transceiver according to claim 2, wherein either the sampled current video clock parameter or the sampled audio clock parameter is a phase of the clock.

4. The video source transceiver according to claim 1, further comprising a video data buffer adapted to store video data received from a video source, and further comprising packet size timing logic adapted to generate and transmit to a functionally associated video sink transceiver a value correlated to an expected data packet size based on video data stored in the video buffer.

5. The video source transceiver according to claim 4, further adapted to generate and transmit to a functionally associated video sink transceiver a countdown message correlated to an expected time of arrival of a data packet.

* * * * *